(12) United States Patent
Ederer

(10) Patent No.: US 6,688,273 B2
(45) Date of Patent: Feb. 10, 2004

(54) SLIDE BEARING FOR AN INTERNAL COMBUSTION ENGINE

(75) Inventor: Ulf Gerhard Ederer, Bad Ischl (AT)

(73) Assignee: Miba Gleitlager Aktiengesellschaft, Laakirchen (AT)

( * ) Notice: Subject to any disclaimer, the term of this patent is extended or adjusted under 35 U.S.C. 154(b) by 0 days.

(21) Appl. No.: 10/068,618

(22) Filed: Feb. 6, 2002

(65) Prior Publication Data

US 2002/0104506 A1 Aug. 8, 2002

(30) Foreign Application Priority Data

Feb. 7, 2001 (AT) .............................. 189/2001

(51) Int. Cl.$^7$ ................................ F02B 75/32
(52) U.S. Cl. .................................... 123/197.3
(58) Field of Search .................... 123/197.3, 197.4; 384/295, 294, 291, 283, 282, 288, 292, 120, 111, 276

(56) References Cited

U.S. PATENT DOCUMENTS 2,187,755 A    1/1940  Ryder
4,561,787 A  * 12/1985 Ehrentraut et al. ......... 384/295
5,238,311 A  *  8/1993 Katou et al. ............... 384/288
5,551,782 A  *  9/1996 Arnhold et al. ............ 384/294
5,607,239 A  *  3/1997 Kumada et al. ............ 384/192

FOREIGN PATENT DOCUMENTS

EP    0 155 257    1/1985
GB    718073       11/1954

* cited by examiner

Primary Examiner—Henry C. Yuen
Assistant Examiner—Hyder Ali
(74) Attorney, Agent, or Firm—Collard & Roe, P.C.

(57) ABSTRACT

A slide bearing for an internal combustion engine having a bearing bore (3) provided in a bearing box (2) is described which is contoured in the form of grooved recesses (8) distributed over the axial length and running in a peripheral direction, and provided with a bearing layer forming a running surface (9) for taking up a bearing journal. In order to create advantageous structural conditions it is proposed that the running surface (9) of the bearing layer (4) applied to the bearing bore (3) has a contour with respect to spacing matching the contour of the bearing bore (3) in the form of grooved recesses (10) distributed over the axial length and running in a peripheral direction.

4 Claims, 2 Drawing Sheets

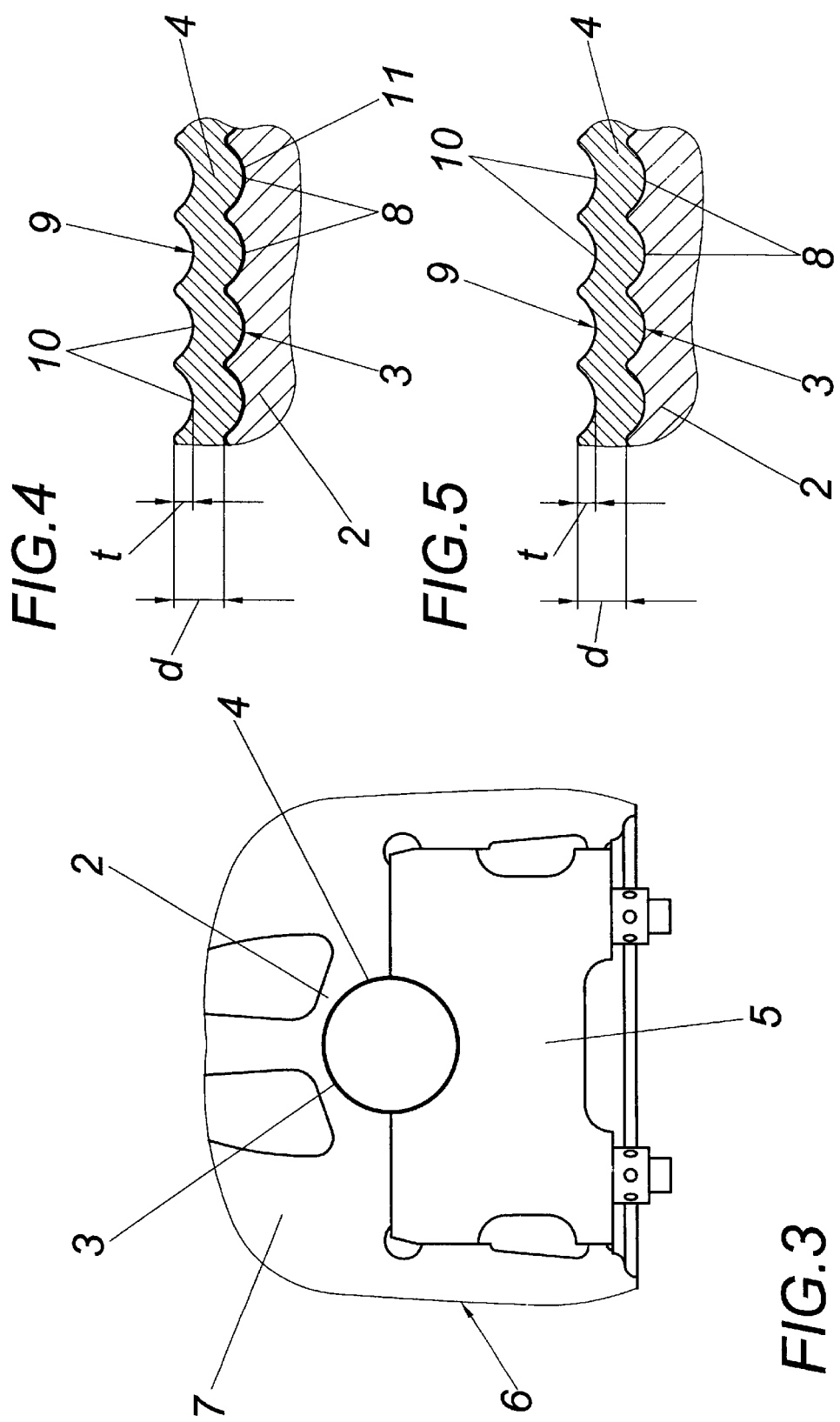

SLIDE BEARING FOR AN INTERNAL COMBUSTION ENGINE

FIELD OF THE INVENTION

The present invention relates to a slide bearing for an internal combustion engine having a bearing bore provided in a bearing box, which is contoured in the form of grooved recesses distributed over the axial length and running in a peripheral direction, and provided with a bearing layer forming a running surface for taking up a bearing journal.

DESCRIPTION OF THE PRIOR ART

Rather than conventional slide bearings with bearing shells set in a bearing box, if slide bearings are used in which the bearing bores in the bearing boxes are coated directly with a bearing layer after an intermediate layer is applied, for bearing the crankshaft of an internal combustion engine in the crank housing or for bearing the crankshaft journal in the connecting rods, the tolerance for the bearing clearance can be reduced due to a range of tolerance for manufacturing the bearing shells to be otherwise considered being omitted here. Because the bearing noise is dependent on the respectively largest bearing clearance, particular significance is given to reduction of the bearing clearance with respect to the formation of noise of these slide bearings and thus diminishing of the range of tolerance decisive for the greatest bearing clearance.

In order to diminish the influence of a hard intermediate layer between the bearing layer and a metallic bearing layer on the durability of a slide bearing in the event of partial wear of the bearing layer, it is known (EP 0 155 257 B2) to provide the surface of the bearing metal layer bearing the intermediate layer with a contour which forms grooves running in a peripheral direction, so that when the running surface, which follows the contour of the bearing metal layer when applied to the intermediate layer, is worn, the intermediate layer penetrating in the vicinity of the running surface cannot form any larger continuous surface areas because with increasing abrasion of the bearing layer the intermediate layer areas lying in the running surface are also worn down, causing the underlying bearing metal layer to be exposed which still ensures adequate slide properties. A requirement for the desired effect is that the intermediate layer be applied to a metal bearing layer and not to a protective steel surface.

Finally, it is known (U.S. Pat. No. 2,187,755 A) to provide the bearing bore of a machine element with a contour in the form of grooved recesses distributed over the axial length and running in a peripheral direction, on which a multilayered bearing layer is deposited galvanically and then partially cut down, creating a smooth, non-profiled bearing surface which displays on its surface alternating areas of different bearing materials. Running surfaces with alternating areas of different bearing materials can improve the bearing conditions with respect to bearing capacity and bearing properties. Such running surfaces with different bearing materials do not however influence noise development.

SUMMARY OF THE INVENTION

The object of the present invention is therefore to provide a slide bearing for an internal combustion engine of the type initially described such that a clear reduction in bearing noise can be reckoned on.

The invention solves this task by the fact that the running surface of the bearing layer applied to the bearing bore has a contour with respect to spacing matching the contour of the bearing bore in the form of grooved recesses distributed over the axial length and running in a peripheral direction.

By means of the contour of the running surface in the form of grooved recesses running in a peripheral direction, the minimum bearing clearance to be given for forming a hydrodynamic lubricant wedge can be reduced for lubrication, because the recesses running in a peripheral direction on the one hand produce an additional supply of lubricating oil in the narrowest gap between running surface and journal, and on the other hand the lubricating oil penetrating axially outwards is hindered on both bearing sides. Surprisingly, the operating safety of the slide bearings is not impaired by the profiling of the bearing bore, even though the bearing layer is applied directly or via an intermediate layer as bonding agent or as diffusion barrier on the steel bearing box. Adhering to narrow ranges of tolerance should be decisive for this, as they are possible only when bearing shells are omitted. Due to the narrow ranges of tolerance and reduction of the lower limit for the bearing clearance advantageous provisions for low-noise slide bearings for bearing a crankshaft in a crank housing or a connecting rod on the crankshaft journal can be ensured.

To guarantee adequate operational safety the depth of the grooved recesses is to be limited upwards. Advantageous ratios result when the depth of the grooved recesses corresponds at most to half the thickness of the bearing layer. So that the effect of the grooved recesses running in a peripheral direction on the size of the minimal clearance to be given can be utilized advantageously, the depth of these recesses in a downwards direction can be limited to a fifth of the thickness of the bearing layer.

Because what matters is the maximum bearing clearance with respect to the development of noise of slide bearings according to the present invention, the wear on the bearing layer should be the least possible. For this purpose the bearing layer can display a minimal hardness of 35 HV. The reduced wear of the bearing layer also offers greater operational safety in conjunction with the profiled bearing bore in the steel bearing box.

BRIEF DESCRIPTION OF THE DRAWINGS

The inventive object is illustrated by way of example in the diagrams, in which:

FIG. 3 shows a crank housing in section in the region of a slide bearing according to the present invention for the crankshaft in a front elevation, FIG. 4 shows a diagrammatic axial section through the bearing layer of a slide bearing according to the present invention on a larger scale, and FIG. 5 is an illustration corresponding to FIG. 4 of a structural variant of a slide bearing according to the present invention.

DESCRIPTION OF THE PREFERRED EMBODIMENT

Figure 1:
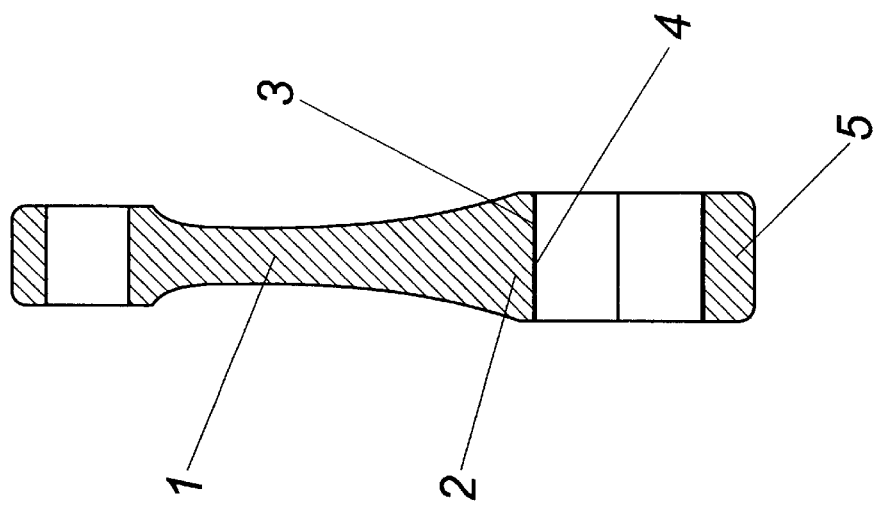
FIG. 1 shows a connecting rod with a slide bearing according to the present invention in a simplified view in the direction of the bearing axis.
Figure 2:
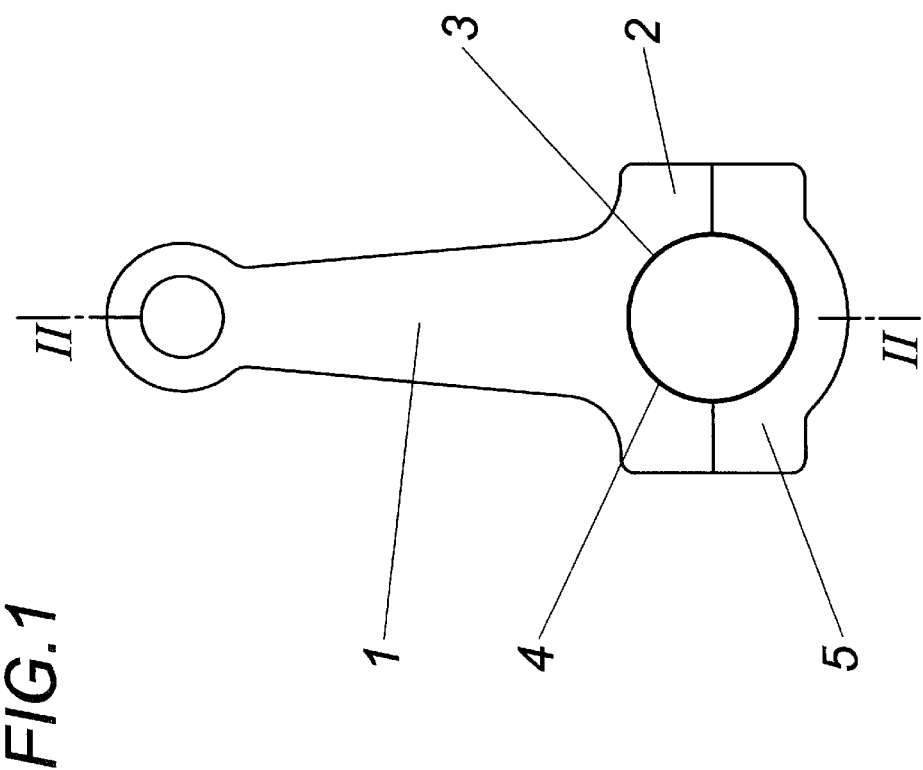
FIG. 2 shows the connecting rod according to FIG. 1 in a section along line II—II of FIG. 1.

The steel connecting rod 1 illustrated in FIGS. 1 and 2, which can also be manufactured by powder metallurgy, forms at its head a bearing box 2 with a bearing bore 3 for a slide bearing for taking up a trunnion of a crankshaft of an internal combustion engine. In comparison to conventional slide bearings with multi-layer bearing shells the bearing bore 3 of the bearing box 2 itself carries the bearing layer 4, thus forming bearing shells. In this way the bearing bore 3 in the bearing box 2 can not only have a smaller diameter, of benefit to the stability of the connecting rod, but the manufacturing tolerance can also be reduced because the range of tolerance for the bearing shells to be considered otherwise does not apply. What matters here is just the tolerance of the bearing bore 3 and the tolerance of the bearing surface thickness, such that in addition the tolerance for the journal diameter and deformation conditional on assembly is to be considered for the range of tolerance of the bearing clearance. The bearing box 2 is partitioned to accommodate the crankshaft journal, forming a bearing cover 5 which has to be screwed to the other part of the bearing box 2.

FIG. 3 illustrates a slide bearing according to the present invention for bearing the crankshaft in the crank housing 6, such that the bearing box 2 is formed by a transverse wall 7 of the crank housing 6. Similar tolerance ratios result, since the bearing layer 4 is again applied to the bearing bore 3. The bearing box 2 is again partitioned in design and forms a bearing cover 5 for the crankshaft to be positioned. The advantage of not having bearing shells is that the bearing bores 3 for the crankshaft can be bored jointly, effectively excluding errors in alignment, as may occur with the use of bearing shells.

It is not only essential for the invention that the bearing bore 3 in the bearing box 2 bears the bearing layer 4, but also that the bearing bore 3 has a contour in the form of grooved recesses 8 distributed over the axial length and running in a peripheral direction, as evident from FIGS. 4 and 5. The bearing layer 4 deposited for example galvanically on the bearing bore follows the contouring of the bearing bore 3, such that the running surface 9 forms a matching contour with respect to spacing likewise in the form of grooved recesses 10. The depth t of these grooved recesses 10 should not be any greater than half the thickness d of the bearing layer 4 and no smaller than a fifth of this thickness d. Depending on the type of bearing layer 4 it can be necessary to provide an intermediate layer 11 between the bearing layer 4 and the bearing box 2 as bonding agent or diffusion barrier, as per FIG. 4. Direct application of the bearing layer 4 without intermediate layer to the bearing box 2 is illustrated in FIG. 5.

Regardless of whether the bearing layer 4 was applied with or without intermediate layer 11 to the bearing box 2, the grooved recesses 10 running in a peripheral direction allow lubricating oil to be absorbed in the running surface 9, which supports hydrodynamic lubrication to be maintained in the narrowest gap between the running surface 9 and the crankshaft journal or the crankshaft, especially since the webs between the grooved recesses 10 prevent the lubricating oil from displacing axially outwards. This means that the smallest bearing clearance to be given for maintaining lubrication can be reduced, resulting in conjunction with the reduced ranges of tolerance in a clear decrease in the maximum bearing clearance. For example, with a journal diameter of 50 mm in the case of standard connecting rod bearings if a preset minimum bearing clearance of 0.04% of the journal diameter has to be reckoned on, the result is a bearing clearance between 20 and 68 $\mu$m due to the range of tolerance. With a slide bearing according to the present invention the bearing clearance can be reduced to 16 to 50 $\mu$m. This means that the maximum bearing clearance of 68 decisive for bearing noise can be reduced to 50 $\mu$m.

Since a standard bearing layer thickness of 12 to 20 $\mu$m can be assumed, the depth t of the recesses 10 is to be limited upwards by 6 to 10 $\mu$m. It should be noted, however, that profiling is evened out not with increasing wear of the bearing layer 4. For this reason the bearing layer 4 is preferably designed with a hardness of approximately 40 HV. The distance of the recesses 10 measured from recess center to recess center can be selected between 120 and 200 $\mu$m, in such a way that the recesses 10 can be formed by a helical peripheral groove. Because it depends only on the geometric shape of the bearing surface 9, the invention is not reliant on the choice of material for the bearing layer 4, if there is assurance that the bearing layer 4 contributes adequate slide properties in the event of correspondingly minimal wear.

What is claimed is:

1. A slide bearing for an internal combustion engine having a bearing bore provided in a bearing box, which is contoured in the form of grooved recesses distributed over the axial length and running in a peripheral direction, and provided with a bearing layer forming a running surface for taking up a bearing journal, characterized in that the running surface of the bearing layer applied to the bearing bore has a contour with respect to spacing matching the contour of the bearing bore in the form of grooved recesses distributed over the axial length and running in a peripheral direction whereby bearing noise is reduced.

2. A slide bearing as claimed in claim 1, characterized in that the depth (t) of the grooved recesses (8, 10) corresponds at most to half the thickness (d) of the bearing layer (4).

3. A slide beating as claimed in claim 2, characterized in that the depth (t) of the grooved recesses (8, 10) corresponds to at least one fifth of the thickness (d) of the bearing layer (4).

4. A slide bearing as claimed in claim 1, characterized in that the bearing layer (4) has minimum hardness of 35 HV.

* * * * *